United States Patent
Hirano et al.

(10) Patent No.: US 7,102,791 B2
(45) Date of Patent: Sep. 5, 2006

(54) MASK PRODUCING METHOD, IMAGE OUTPUTTING DEVICE AND COMPUTER READABLE RECORDING MEDIUM

(75) Inventors: Masanori Hirano, Kanagawa (JP); Satoshi Ohuchi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1072 days.

(21) Appl. No.: 10/096,823

(22) Filed: Mar. 14, 2002

(65) Prior Publication Data

US 2002/0171874 A1     Nov. 21, 2002

(30) Foreign Application Priority Data

| Mar. 16, 2001 | (JP) | ............... 2001-075548 |
| May 24, 2001 | (JP) | ............... 2001-155532 |
| Mar. 13, 2002 | (JP) | ............... 2002-067791 |

(51) Int. Cl.
*H04N 1/405* (2006.01)
*H04N 1/407* (2006.01)
*H04N 1/52* (2006.01)
*H04N 1/58* (2006.01)

(52) U.S. Cl. ............... 358/3.13; 358/3.14; 358/3.18; 358/3.22; 358/3.26; 358/533; 358/535

(58) Field of Classification Search ........ 358/3.13–3.2, 358/3.06, 1.9, 3.21–3.22, 3.26, 533–536; 382/270

See application file for complete search history.

(56) References Cited

U.S. PATENT DOCUMENTS

| 4,890,121 A | * | 12/1989 | Hirahara et al. ............. 358/296 |
| 4,920,501 A | | 4/1990 | Sullivan et al. |
| 5,214,517 A | | 5/1993 | Sullivan et al. |
| 6,122,407 A | * | 9/2000 | Peters ........................ 382/270 |
| 2004/0218221 A1 | * | 11/2004 | Hirano et al. .............. 358/3.06 |
| 2004/0234312 A1 | * | 11/2004 | Woods ........................ 400/76 |

FOREIGN PATENT DOCUMENTS

| EP | 0647058 A2 | 4/1995 |
| EP | 0 865 195 A2 | 9/1998 |
| JP | 8-80641 | 3/1996 |
| JP | 2622429 | 4/1997 |
| WO | WO 92/10905 | 6/1992 |

OTHER PUBLICATIONS

Robert Ulichney, "The Void-and-Cluster Method for Dither Array Generation"; SPIE vol. 1913, pp. 332-343.

* cited by examiner

*Primary Examiner*—Scott A. Rogers
(74) *Attorney, Agent, or Firm*—Dickstein Shapiro LLP

(57) ABSTRACT

A mask is produced for converting multi-level image data into a halftone image through comparison with a threshold for each pixel. For this purpose, a dot pattern is determined on each of predetermined gray scale levels, and, the mask is created by the dot patterns obtained at the step, where the respective dot patterns are determined independently for every gray scale level.

25 Claims, 14 Drawing Sheets

FIG.2A
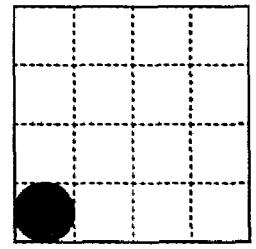
GRAY SCALE 16/16
↑
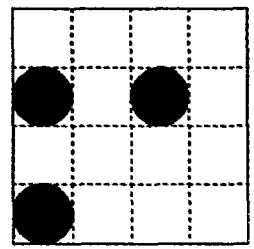
GRAY SCALE 8/16
↑
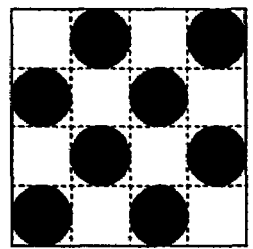
GRAY SCALE 3/16
↑
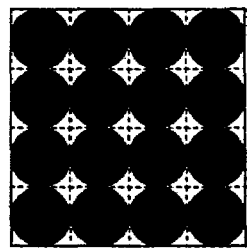
GRAY SCALE 1/16
FIG.2B
| 1 | 9 | 3 | 11 |
|---|---|---|---|
| 15 | 5 | 13 | 7 |
| 4 | 12 | 2 | 10 |
| 14 | 8 | 16 | 6 |
↑
| 1 | | 3 | 7 |
|---|---|---|---|
| | 5 | | |
| | | 2 | |
| 4 | 8 | | 6 |
↑
| 1 | | 3 | |
|---|---|---|---|
| | | | |
| | | 2 | |
| | | | |
↑
| 1 | | | |
|---|---|---|---|
| | | | |
| | | | |
| | | | |

FIG.4

```
PATTERN 1a
PATTERN 1b
PATTERN 1c
```

| 0 | 0 | 1 | 0 |
|---|---|---|---|
| 1 | 0 | 0 | 1 |
| 1 | 0 | 1 | 0 |
| 1 | 0 | 0 | 1 |

1:ON-DOT
0:OFF-DOT

| 255 | 144 | 32 | 96 |
|---|---|---|---|
| 48 | 192 | 80 | 224 |
| 112 | 16 | 128 | 176 |
| 160 | 208 | 64 | 1 |

FIG.10A   FIG.10B   FIG.10C
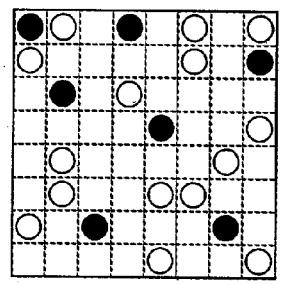 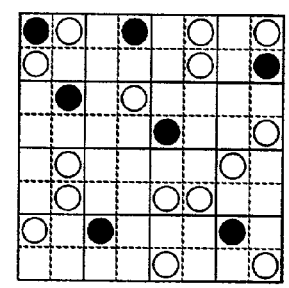 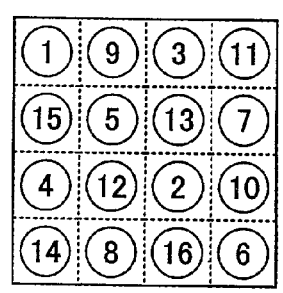
FIG.11A   FIG.11B   FIG.11C   FIG.11D
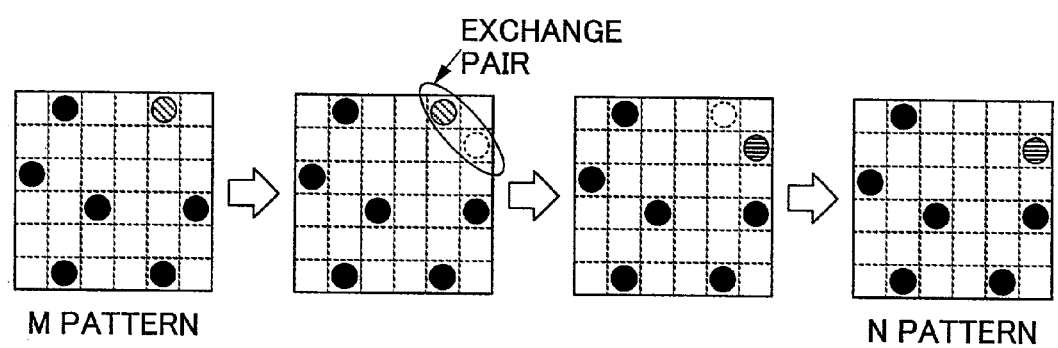
M PATTERN                                   N PATTERN
FIG.11E   FIG.11F
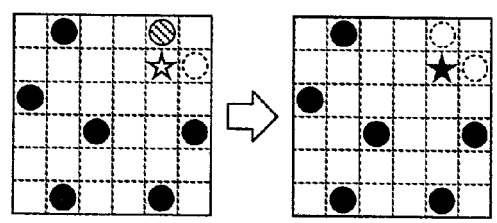

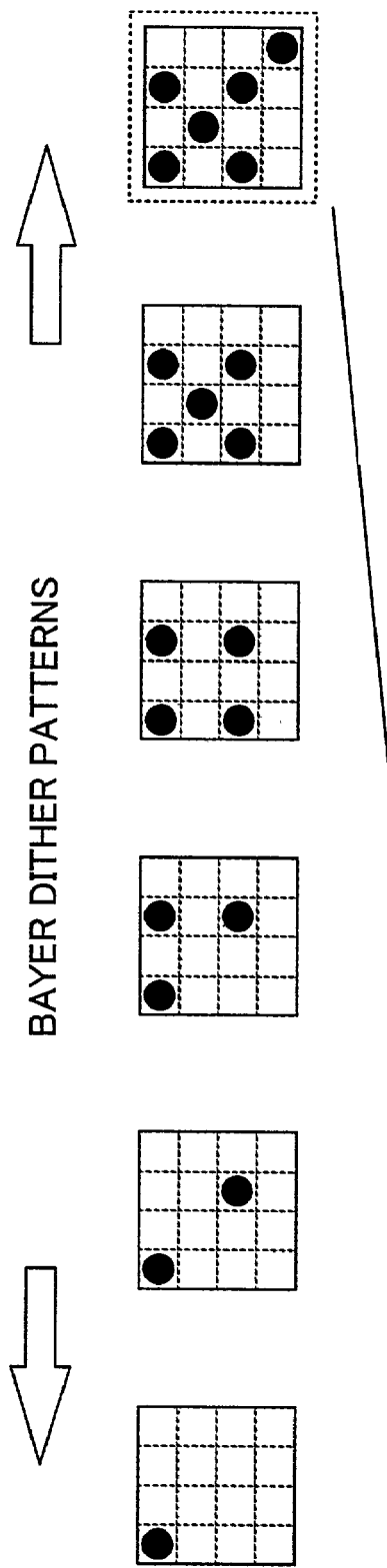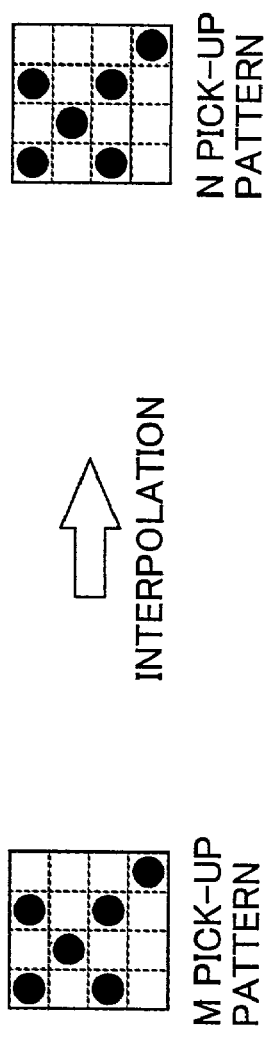
FIG.12A FIG.12B FIG.12C FIG.12D FIG.12E FIG.12F
BAYER DITHER PATTERNS
LAST PATTERN OF BAYER DITHER RANGE IS USED AS PICK-UP PATTERN
FIG.12G
M PICK-UP PATTERN
INTERPOLATION
FIG.12H
N PICK-UP PATTERN

# MASK PRODUCING METHOD, IMAGE OUTPUTTING DEVICE AND COMPUTER READABLE RECORDING MEDIUM

BACKGROUND OF THE INVENTION

1. Field of the Invention

The present invention relates to a mask producing method, an image outputting device and computer readable recording medium, in particular, to a mask producing method for producing a mask of a threshold matrix by which a halftone-dot image is created with an image quality improved, the threshold matrix being used for generation of halftone image in digital image processing, and, to a so-called FM mask, a type of the threshold matrix, attracting attention in terms both of processing speed and image quality, an image outputting device, and a computer readable recording medium storing a software program, and mask data, thereof.

2. Description of the Related Art

As a method of producing a halftone image in digital image processing, i.e., a method of expressing a shade or gray scale of an image by a combination of on-dot (for example, black dot) and off-dot (for example, white dot), there are "dithering" and "error dispersion method", and they have the following characteristics, respectively.

First, dithering will be described now.

Dithering is a method of converting original multi-level image data into a corresponding dot pattern using a threshold matrix (referred to as a "dither matrix", or, simply, "mask", hereinafter) produced based on a specific rule, by comparing with the original multi-level image data every pixel.

FIG. 1 shows a type of dithering. As shown in the figure, dithering expresses a gray scale by changing the density of on-dots, and includes a frequency modulation scheme (FM mask) dithering and an area modulation scheme (AM mask) dithering. According to the FM mask dithering, the density of uniformly dispersed on-dots is controlled.

There, in order to reproduce 8-bit-per-pixel multi-level information by an outputting unit/device having a lower expressing capability, on-dot density should express information in depth direction (8 bits) of the original image data has, on plane coordinates. In this case, in order to keep one-to-one correspondence between the characteristics, such as on-dot (for example, black dot) density and gray scale of the output image, the number of on-dots present within a predetermined area should be determined for every gray scale level, necessarily, as shown in FIG. 2A, for example.

The above-mentioned dither matrix is produced as a result of on-dot arrangements being summarized in a table on a predetermined area for respective gray scale levels, while matching is held with regard to the order of on-dot occurrence along gray scale before and after a relevant gray scale level, as shown in FIG. 2B. FIG. 2A shows on-dot arrangement determined for each gray scale level, while FIG. 2B shows a process of producing a dither matrix according to the on-dot arrangements shown in FIG. 2A.

The control of the order of on-dot occurrence along the gray scale is made for preventing that a difference in dot pattern in the meantime may be recognized in an output image as a stepwise manner, at a time a dither matrix to be applied is switched on an image in which gray scale changes gradually.

Although it is possible as a dither matrix to apply a matrix having a size the same as that of an input original image theoretically, since a memory capacity needed would become huge, it is common to apply a dither matrix of size much smaller than an original image, while repeatedly shifting it a position, area by area, in a manner of tile placement, on an original image, as shown in FIG. 3, so as to perform conversion to a halftone dot pattern.

Since this dithering is comparatively simple for operation processing, the processing speed can be secured, and, this scheme may be applied to an image requiring a medium (not very high) image quality. In this scheme, generally, it is noted that a measure should be taken against Moiré.

On the other hand, although processing speed is slow due to complex processing required, the error dispersion method may be applied to an image requiring a high or very high image quality. Of course, this scheme requires relatively high cost on the other hand.

Thus, since any schemes have particular merits and demerits, as for dithering and error dispersion schemes, it is common to properly select one of them according to a nature of an image output uniting applied or a type of image to be processed.

At late in the 1900s, a halftone processing scheme having features including merits of these two types of schemes was proposed. Generally, this scheme is called "FM mask method", "FM screen method" or "blue noise mask method", and is similar to a Bayer-type method which is a type of "dithering", and employs a way of the same frequency modulation type (FM) mask comparing method.

According to this. FM mask method, a threshold matrix is applied which is determined in consideration of frequency characteristic (blue noise characteristic, or BN characteristic) only concerning high frequency component except low frequency component in case of threshold determination. Though it is a mask comparing method, it is possible to prevent periodicity in low frequency from being conspicuous as in case of Bayer-type method or dot-collection type dithering, and, also, to prevent generation of Moire, as a result, the resolution characteristic as superior as that in case of application of the error diffusion method can be acquired. Therefore, this method attracts attentions from various fields, i.e., a printing field, and so forth, and various approaches are tried thereon.

For example, as an initial trial, after carrying out Fourier transform on a completely random (white noise) dot pattern, then filtering with a filter with BN characteristic is performed, and, then, inverse Fourier transform is performed, so that an ideal FM mask may be produced, according to "Method and Device for converting Gray Scale Image into Halftone Image by using Blue Noise Mask" disclosed in Japanese patent No. 2622429.

Moreover, according to "The Void-and-Cluster Method for Dither Array Generation" (Robert Ulchney, Digital Equipment Corporation, Maynard, Mass., 01754-2571), SPIE, vol. 1913, the contents thereof being incorporated therein by reference, a method (referred to as a 'void and cluster method or scheme', hereinafter) is disclosed of comparing a void (image region having coarse on-dots) and a cluster (image region having dense on-dots), and exchanging on-dots therebetween, thereby, performing mask optimization.

However, according to any of these schemes, as a calculation result finally obtained depends on a random pattern as a starting point, it should be different each time. Furthermore, since it is necessary to reconstruct a uniform distribution state from an uneven distribution state, huge calculation time is required if the size of a mask becomes large.

Then, according to "Improved method and device of generating halftone image while reducing worms in gray scale image" disclosed by Japanese laid-open patent application No. 8-80641, a starting mask (initial dot pattern) made according to the error diffusion scheme is applied.

According to this scheme, a random element can be eliminated as a result of a dot pattern used as a starting point being arbitrarily controllable, and thereby, recursion of a calculation result can be secured. Furthermore, calculation time can be shortened while the quality of the mask finally produced can be improved as a result of a uniform distribution being able to be applied at an initial stage. However, as this method is a so-called 'sequential method' in which, from such a starting dot pattern, optimization is performed step by step along gray scale, a dot arrangement is thus necessarily restricted by an immediately precedingly determined dot pattern.

Accordingly, even when the starting dot pattern is ideal in terms of avoiding graininess and/or texture characteristic, it is a feature being held only at a starting point, and, after adding on-dots thereto so as to produce a dot pattern in a subsequent gray scale level, this feature may be degraded. Then, after repeating this process for producing dot patterns for the subsequent gray scale levels, so as to build a final FM mask, difference from the starting point is accumulated gradually, and, accordingly, the final FM mask may be far different from the ideal one.

Although various optimization functions and search methods for ideal dot arrangement have been tried in order to prevent such quality degradation in dot arrangement as described above, any schemes may not completely solve this problem as long as the method is the above-mentioned sequential method by which, as mentioned above, restriction due to immediately preceding gray scale level should be accumulated.

SUMMARY OF THE INVENTION

The present invention has been devised for the purpose of solving the above-mentioned problem, and, an object of the present invention is to provide a halftone conversion mask such as an FM mask through a comparatively simple configuration while having an ability to maintain the quality of dot arrangement in all gray scale levels.

In order to achieve this object, according to the present invention, while such a sequential method as that of building a mask through determining of dot patterns for gray scale levels one by one stepwise is not completely applied, plurality of gray scale levels which are not adjacent and which are separate by predetermined intervals mutually are taken up, and, thereon, optimization of dot pattern is performed independently. Then, after that, as to gray scale levels present between these previously determined ones, interpolation scheme is applied to determine relevant dot patterns.

Consequently, since it can prevent that the quality of dot arrangement deteriorates gradually as accumulation of error is cancelled for every predetermined interval and the above-mentioned interval is filled appropriately according to the interpolation processing, it is possible to secure the continuity between these separate gray scale levels. Consequently, it becomes possible to produce a mask with more good quality.

Moreover, after producing the dot pattern which do in this way, i.e., the independent optimization has been made for every gray scale pick up as mentioned above, it is preferable to produce dot pattern in the intermediate gray scale level with gradually canceling the difference between the dot patterns on the gray scale levels on both ends of the relevant gray scale section. In this method, the optimization processing which needs high-precise calculations should be made only for the pick-up gray scale levels, and, thus, it is possible to effectively reduce the total processing time. Furthermore, as the difference between the optimized dot patterns is cancelled gradually as mentioned above, the continuity of the halftone pattern along the gray scale can be secured, and it becomes possible to produce a mask with more good quality.

Furthermore, it is preferable to perform the above-mentioned processing of canceling the difference between the above-mentioned optimized dot patterns between dots which are neighboring based on predetermined order. Consequently, it is possible to accelerate the interpolation processing itself and to produce a mask with more good quality for a short time, with maintaining the uniformity in on-dot distribution to some extent.

Furthermore, it is preferable at a time of the canceling the difference between the above-mentioned optimized dot patterns to carry out predetermined evaluation on a dot pattern of intermediate gray scale level obtained thereby so that the dot pattern for which the evaluation result be the best one should result as the relevant gray scale level. Consequently, even in case the above-mentioned optimized dot pattern is produced by random exchange or exchange according to a specific order etc., since the evaluation function is performed on relevant dot pattern, it is possible to prevent mask quality from becoming unstable or texture depending on the specific order from occurring.

Furthermore, it is preferable to apply the evaluation function considering both avoidance of graininess and keeping equal direction characteristic in case of the difference cancellation between optimized dot patterns. Consequently, it is possible to produce the mask for obtaining an image quality as in a case of applying error diffusion processing.

Moreover, it is also possible to use a dot pattern including an on-dot which is not turned on in any of the dot patterns of both ends of the relevant gray scale section at a time of the difference cancellation between the above-mentioned optimized dot patterns. Consequently, it is possible to raise mask quality also for the intermediate gray scale level by utilizing a dot pattern not completely depending on the first determined dot pattern.

As for the minimum interval between the gray scale levels chosen first as mentioned above, it is preferable to set it as being not narrower than ⅟₃₂ the total number of gray scale levels. Consequently, it is possible to effectively shorten the total processing time, and, also, to cause disconnection of continuity which otherwise would occur due to setting shorter intervals provided between the individually optimized dot patterns.

Moreover, it is preferable to change the interval of the above-mentioned gray scale levels for which optimization is performed first, according to image regions, such as a highlight region, an intermediate region, and a shadow region. Consequently, for example, for a region in which change in gray scale is not noticeable, or a region for which a specific texture tends to occur by optimization, a large interval may be set between the gray scale levels chosen first and thus operation time may be shortened. Also, it is possible to control generation of texture by performing the interpolation processing in the meantime.

Furthermore, it is also possible to determine dot arrangement sequentially for every gray scale level for a specific gray scale range. Thereby, it is possible to apply the conventional sequential method for an image region for which continuity along gray scale change is strictly required, and, thereby, it is possible to prevent even slight discontinuity which may occur in use of the interpolation processing.

Moreover, a dot pattern obtained by usual halftone processing of Bayer-type dithering. etc. may be adopted for the gray scale levels chosen first. Consequently, it is possible to shorten the operation time concerning mask production. Moreover, in case a dot pattern obtainable by applying conventional halftone processing serves as a more suitable dot arrangement, it becomes possible to perform the conventional halftone processing to produce a mask for a short time.

Furthermore, in case the dot pattern by the above-mentioned conventional halftone processing is determined for the gray scale levels chosen first, it is possible to adopt a dot pattern obtained by the same conventional halftone processing, and thus, to produce a mask also for each gray scale level inserted between the gray scale levels first processed. Consequently, it is possible to positively shorten the operation time, and secure the continuity between gray scale levels. Furthermore, it is possible to apply a same type of dot pattern for a plurality of gray scale levels so as to reduce the number of total dot patterns and to shorten mask production time.

Furthermore, in case a dot pattern obtained by the above-mentioned conventional halftone processing is adopted and thus, a mask is produced, it is possible to select halftone processing applied there according to functions, such as a gray scale characteristic, resolution, and/or pixel reproducibility of the image outputting unit which outputs the image processed by the halftone processing concerned by using the mask concerned. Consequently, in case of the image output unit of an electro-photographic type which has a variation in pixel reproducibility in a highlight part, etc., by adopting a mask obtained by the processing suitable for this characteristic, high image quality can be obtained throughout the whole gray scale.

Furthermore, in case the mask pattern by the above-mentioned conventional halftone processing is adopted and a mask is thus produced, it is preferable to adopt halftone processing scheme applied there according to an image mode applied in the image outputting unit at a time of outputting the image processed by the halftone processing concerned using the mask concerned. For example, there is a case where systematic dithering which causes regular dot arrangement is preferable than the FM mask which causes dot arrangement similar to that caused by the error diffusion scheme. In such a case, the most suitable scheme may thus be applied.

Furthermore, determination of the above-mentioned dot pattern includes processing which evaluates distance between on-dots in the dot pattern, and, it is preferable to perform the evaluation with a weight in particular on a specific direction.

Consequently, generation of a texture which has a periodicity in a specific direction which is likely to be remarkable to human eyes/human rituality can be prevented, while the processing time required can be shortened.

Moreover, it is also preferable that the weight applied is gradually reduced from the central direction. Thereby, a possibility of occurrence of a blank portion in a certain specific part can be avoided.

BRIEF DESCRIPTION OF THE DRAWINGS

Other objects and further features of the present invention will become more apparent from the following detailed description when read in conjunction with the following accompanying drawings:

FIGS. 2A and 2B illustrate FM mask production process;

FIG. 4 shows an example of an FM mask produced by a mask producing method according to the present invention;

FIG. 5 shows another mode of FM mask.

FIGS. 8A through 8C, 9A through 9C, 10A through 10C and 11A through 11F illustrate how to determine dot patterns on intermediate gray scale levels to be provided between the first processed dot patterns shown in FIGS. 7A and 7B;

FIGS. 12A through 12H show example of a scheme of combining an FM mask made by halftone processing in a conventional type, and an FM mask produced by the first embodiment of the present invention;

DETAILED DESCRIPTION OF THE PREFERRED EMBODIMENTS

Hereafter, preferred embodiments of the present invention will be described in detail based on the accompanying drawings. Although the embodiments described below include preferable various limitations technically, the scope of the present invention is not limited to these modes.

FIG. 4 shows an example of configuration of a halftone conversion mask (namely, a threshold matrix as described above) 1 produced by a mask producing method in a first embodiment of the present invention, where dot patterns 1*a*, 1*b* and 1*c* on respective gray scale levels a, b and c are produced independently. Consequently, it is possible to remove the above-mentioned accumulation of errors or restrictions as compared with a case a mask is produced through the sequential method.

In the related art, a halftone conversion mask such as that shown in FIG. 5 is adopted in terms of limited performance of CPU, memory, operation system (OS), and so forth for the purpose of price reduction. Such a mask 100 covers all of dot arrangement patterns in respective gray scale levels in one mask, and each square corresponds to 1 dot.

Figure 1:
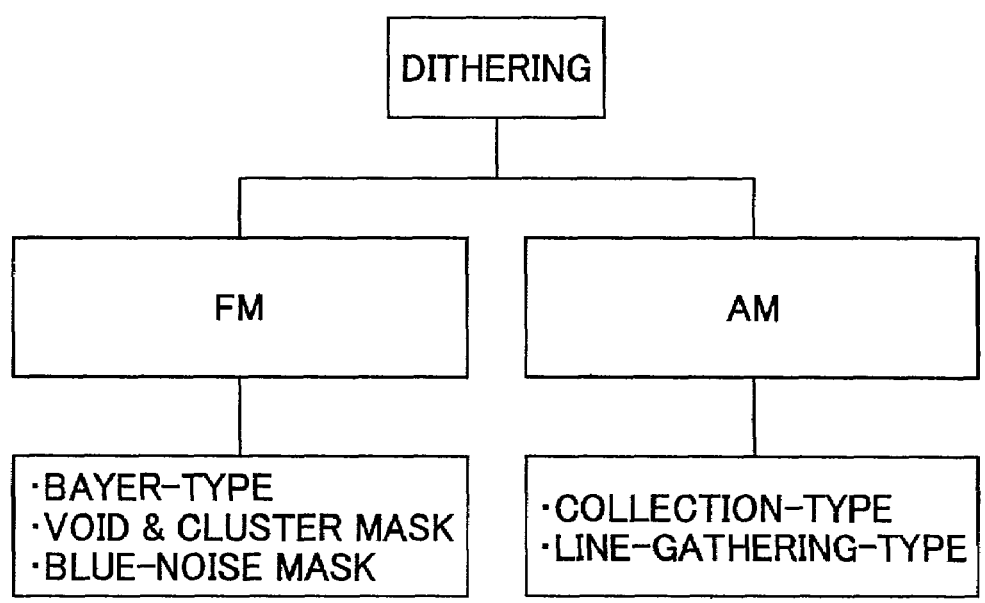
FIG. 1 shows a classification of dithering.
Figure 3:
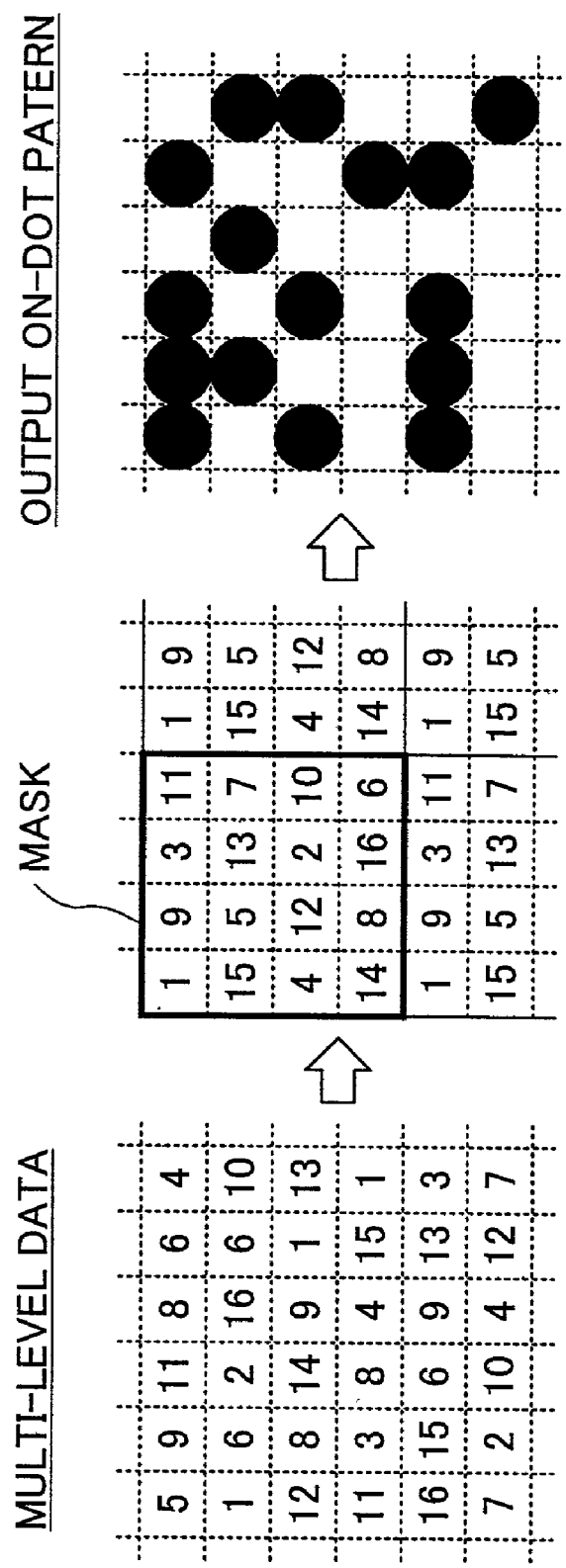
FIG. 3 illustrates how to apply the FM mask on a given multi-level image.

This mask is applied for every portion of an input image, and pixel value comparison is carried out for every dot each time. Then, if the pixel value of the input image is higher, it is converted into an on-dot, while, if lower, it is converted into an off-dot. By applying this operation repeatedly to the whole area of the input image, it is possible to convert the whole input image into a corresponding halftone image (see also FIG. 3).

However, since the throughput of CPU/OS is improved and scale-up and price reduction of memory is achieved by rapid technical development in recent years, a method of first preparing individually a dot pattern which corresponds to every gray scale level (also see FIG. 2A), and then, applying the thus-prepared dot patterns to corresponding gray scale level parts of an input image, respectively, can be applied.

Further, it is also possible to produce a threshold mask, such as that shown in FIG. 5, based on dot patterns on respective gray scale levels, as those shown in FIG. 4, in a manner described above with reference to FIGS. 2A and 2B. That is, it may also be said that the above-described method of preparing dot patterns on respective gray scale levels is one method for obtaining a threshold mask such as that shown in FIG. 5.

Figure 6:
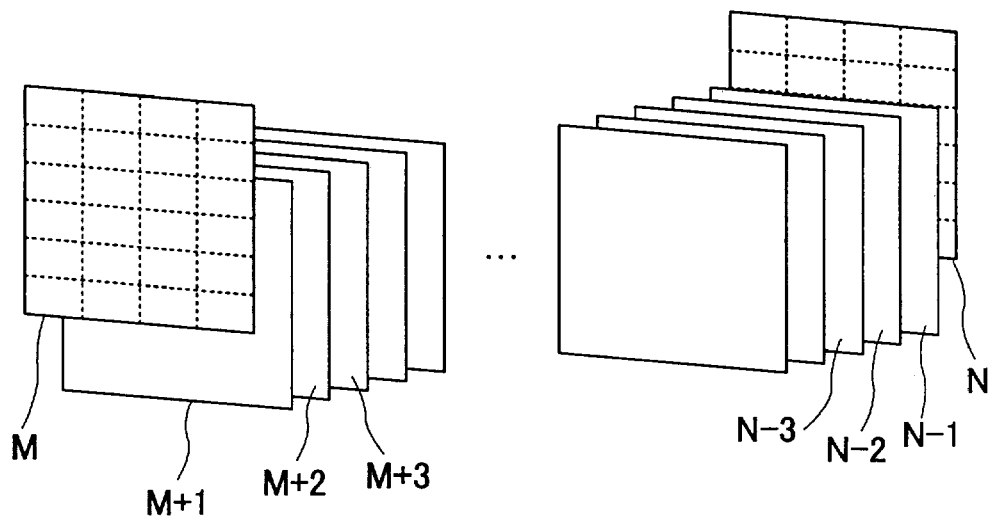
FIG. 6 shows a state of choosing/picking up a plurality of gray scale levels which are not continuous therebetween as a step of FM mask production procedure in a first embodiment of the present invention.
Figure 7A:
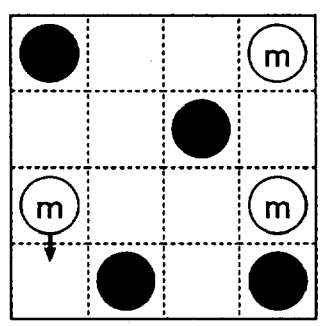
FIGS. 7A and 7B show example of respective dot patterns on the gray scale levels m and n chosen as shown in FIG. 6.
Figure 7B:
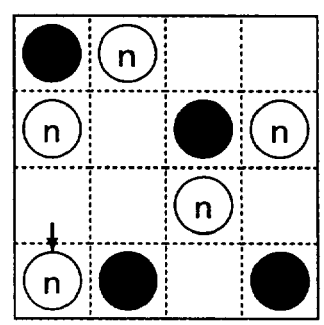

Another form of an FM mask (a set of dot patterns) in the first embodiment of the present invention is produced in a basic production procedure described below. That is, first, as shown in FIG. 6, a plurality of gray scale levels which are not adjacent together are chosen (m and n in FIG. 6) and, then, as shown in FIGS. 7A and 7B, for the thus-selected gray scale levels m and n, the optimum dot patterns are generated individually, respectively. In each of figures which will be described now, a black circle ● denotes an on-dot common between the gray scale levels n and m (referred to as a common dots, hereinafter); white circle ○ denotes an on-dot different therebetween (referred to as a different dot, hereinafter), and a squire having no circle denotes an off-dot.

Figures 8A, 8B, 8C:
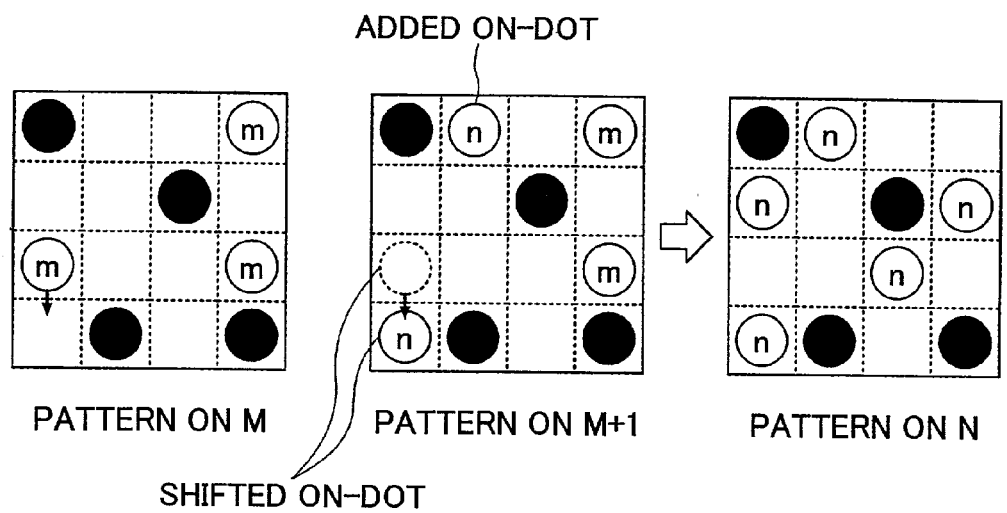

Next, in each of these gray scale levels, the above-mentioned common dots and difference dots of the optimum dot patterns are sorted out, and, then, along the number of gray scale levels present between these optimum patterns m and n, as shown in FIG. 8B, a dot pattern present in the gray scale section m through n is produced by canceling the above-mentioned different dots one by one.

At this time, in order to achieve the corresponding gray scale levels along with the increase in gray scale level one by one from m to n, it is necessary to increase the number of on-dots accordingly. In this case, it is preferable to determine that difference in dot pattern between adjacent gray scale levels is as small as possible through the dot patterns present between the gray scale levels m and n (for the purpose of securing matching in on-dot occurrence sequence along with increase in gray scale level). For this purpose, for example, a method of generating dot patterns optimum one by one according to the above-mentioned sequential method may be applied between this defined gray scale range.

Such processing is performed over the whole gray scale. That is, the whole gray scale range is divided into a plurality of sections, and a dot pattern on the gray scale level in each dividing point is independently determined first as an optimum dot pattern for the gray scale level. As to dot patterns on the gray scale levels present between these dividing points, they are then produced one by one based on the previously optimized dot patterns on the gray scale levels at the both ends of the relevant section, i.e., the dot pattern on the gray scale level at the dividing points. Consequently, a suitable halftone conversion mask, i.e., a set of dot patterns for the respective gray scale levels can be obtained.

As to a method of producing optimum dot patterns on the first pick-up gray scale levels at the dividing points, various methods may be applied therefor, for example, the above-mentioned void and the cluster method, blue noise filter using method disclosed by the above-mentioned Japanese patent No. 2622429, or another method applying any of evaluation functions proposed so far.

The difference in gray scale level, i.e., the pitch (m-n) between the pick-up dividing points should not be necessarily fixed. It is possible to aim at shortening of processing time by widening this pitch as for such a shadow part as that in which the influence of dot arrangement is not likely to be conspicuous. Moreover, when this pitch is conversely made too narrow, change in dot arrangement between the gray scale levels at the dividing points may become noticeable, and it may become a problem in respect of the continuity of gray scale in an output image.

According to a result of evaluation experiment conducted by the inventors on this point, as a numerical value of the above-mentioned pitch, an interval wider than the interval corresponding to a number of gray scale levels $\frac{1}{32}$ of the total number of gray scale levels, or an interval corresponding to a number of gray scale levels approximately $\frac{1}{16}$ of the total number of gray scale levels of gray scale levels should be set so that the quality on the continuity of gray scale is securable.

A specific scheme of the interpolation processing for gray scale levels present between the above-mentioned dividing points will now be described with reference to FIGS. 9A through 11F. As to the interpolation processing, various methods can be considered according to how the balance between processing time (operation time) and mask quality is determined. First, in terms of shortening the processing time, a scheme will now be described based on FIGS. 9A through 9C.

Figures 9A, 9B, 9C:
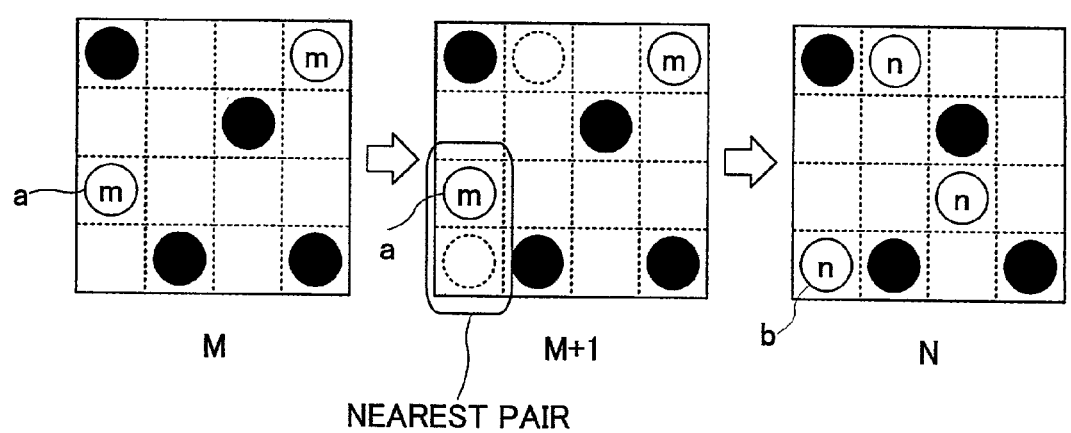

According to this scheme, ON/OFF is replaced between the nearest different dots. In the case of the example of FIGS. 9A through 9C, the portion enclosed by the circle in FIG. 9B is a portion in which a different dot 'a' on the dot pattern of the gray scale level m and a different dot 'b' on the dot pattern of the gray scale level n are adjacent to one another. Thus, these different dots may be called near different dots. Thus, ON/OFF of these contiguity dots are replaced in the pattern of the gray scale level m+1 shown in FIG. 9B. In FIG. 9B, a broken circle shows the different dot position on the dot pattern of the gray scale level 'n'.

Further, with regard to this scheme, an order of processing these near different dot pairs will now be described. First, as an easiest way, the pair on which the distance between the relevant difference dots is minimum is processed first. Other than this scheme, there is a scheme as will now be described with reference to FIGS. 10A through 10C. According to this scheme, it is assumed, different from the example of FIGS. 9A through 9B, a dot pattern of 8×8 matrix is assumed as a dot pattern for the FM mask as shown in FIG. 10A, and is divided into sixteen 4×4 matrices as shown in FIG. 10B. Then, according to an order such as that shown in FIG. 10C, i.e., well-known Bayer-type arrangement, conventional FM mask arrangement or the like, the different dot pairs are selected in sequence accordingly.

Next, the following methods may be considered as methods rather in consideration of importance on mask quality. That is, such a combination of different dots is selected that, calculation of a specific evaluation function is performed on the dot pattern-obtained by dot exchange between the different dot pair in the relevant combination, and the evaluation result become the best among the other possible combinations. This scheme of applying evaluation of dot pattern by using the specific evaluation function is effective, because, otherwise, according to the method mentioned above such as to give a priority on reduction of processing speed, an undesirable dot density change, a texture caused by an ordering matrix used for selecting the different dot pair, or the like may occur.

As the above-mentioned evaluation function used in the method of considering importance of mask quality, any of the evaluation functions proposed for producing the satisfactory FM mask described above in the description of the method of producing optimum dot pattern on the gray scale level of each dividing point may also be applied. For example, as an example of this evaluation function, functions representing VTF (approximation of human visuality characteristics) and equal direction characteristics (two-dimensional uniformity in dot arrangement) such as those below may be used:

Evaluation Value=$\Sigma_{(x, y)} \{2D\_FFT[\text{Bit\_map } (x, y)]\}^2 \cdot VTF$ where:

Bit_map (x, y): a pixel mask in which each pixel is represented by 0/1;

2D_FFT: two-dimensional fast Fourier transform; and $VTF (x, y) = 5.06 \exp[-0.138 \cdot f(x, y)] \cdot \{1.0 - \exp[-0.1 \cdot f(x, y)]\}$;

and $$f(x, y) = \frac{\pi \cdot L \cdot d \cdot \sqrt{x^2 + y^2}}{(25.4 \cdot 180)}$$

Equal Direction Characteristics $$= \frac{s^2(fr)}{p^2(fr)}$$

where:

$p^2$ (f r): linear power spectrum; and $s^2$ (f r): dispersion of p(f r)

By using the function (VTF) which approximates such human visuality characteristics, the much more suitable frequency characteristic for the visuality can be provided on an output image rather than in the method given in Japanese Patent No. 2622429 in which a low frequency domain is cut off simply. Moreover, by applying the equal direction characteristics so as to increase uniformity in dot arrangement, graininess or texture characteristics due to unevenness in dot arrangement can be avoided.

As another method of producing dot patterns in the interpolation processing present between the dividing points superior in terms of mask quality, there is a method in which an on-dot (referred to as a "hollow on-dot", hereinafter) not present in any of the dot patterns in the gray scale levels at both ends of the relevant section (interpolation section) is used. According to the methods mentioned above, selectable on-dot position is restricted by the dot arrange of the gray scale level on the dividing point. Thereby, the dot arrangement on the relevant gray scale level may not be sufficiently optimum in the interpolation section.

Then, as shown in FIGS. 11E and 11F, a dot position, indicated by a star mark in these figures, and is not included in any of the dot patterns on the gray scale levels n and m at the dividing points, is used as a dot position which is temporarily turned on as the above-mentioned hollow on-dot in a dot pattern present intermediately in the relevant section.

There, the position of the above-mentioned hollow on-dot should be selected so that the resulting dot pattern shown in FIG. 11E thus has an optimum one for the relevant gray scale level. By adopting such a method, the degree of optimization for the relevant gray scale level of the interpolation processing section can be improved. However, this hollow on-dot is an on-dot which can exist only in the interpolation processing section, and therefor, should be deleted before reaching the other end of the relevant section during the process of producing dot patterns present in the relevant section. In this viewpoint, it is not preferable to provide many hollow on-dots, or to use the hollow on-dots continuously for a relatively large number of intermediate gray scale levels.

FIGS. 11A, 11B, 11C and 11D illustrate the scheme same as that described above with reference to FIGS. 9A through 9C, while FIGS. 11A, 11E, 11F and 11D illustrate the above-mentioned scheme of using the hollow on-dot. In FIGS. 11A through 11F, each black circle represents a common dot present in both the dot patterns of the gray scale levels m and n;, each oblique-hatched circle represents a different dot only present in the dot pattern of gray scale level m; each vertical hatched circle represents a different dot only present in the dot pattern of the gray scale level n; and the star mark represent the hollow on-dot.

Moreover, the halftone conversion mask, i.e., a relevant set of dot patterns, between the gray scale levels m through n thus produced may be combined with a halftone conversion mask of other gray scale level range produced by another halftone processing scheme of the conventional type as shown in FIGS. 12A through 12H. That is, it is possible, by using the scheme of generation of the optimum pattern of the dividing point and generation of the pattern by the interpolation processing on an intermediate portion described above, to also combine the above-described mask producing method with a different halftone processing scheme.

For example, FM mask can provide a high definition halftone image by adopting a dot arrangement obtained by the error diffusion scheme as the dot pattern of the dividing point. However, for a highlight part of an input image, a periodic dot arrangement may provide a desirable impression by the Bayer-type scheme rather than such an error-diffusion-type dot arrangement. Such a tendency can be seen especially on a graph image used frequently in business documents.

In a such case, it is possible to use the following scheme. That is, a halftone conversion mask is produced according to the Bayer-type scheme for a gray scale range in which dot arrangements according to the Bayer-type scheme give more satisfactory impression. Then, for the other gray scale ranges, the gray scale levels at both ends of the gray scale range to which the Bayer-type scheme has been applied are regarded as those at the pick-up dividing points according to the first embodiment of the present invention, and, also, further dividing points are pick up on the outsides of this Bayer-type-scheme applied gray scale range. Then, the dot patterns in the intermediate portions between these dividing points outside of the Bayer-type-scheme applied gray scale range are determined according to the interpolation processing according to the first embodiment of the present invention.

There is a case where a specific halftone processing should be applied depending on an image outputting unit to be applied so as to provide a stable output image. That is, in the image outputting unit with an engine of an electro-photographic type or a thermal transfer type, dot reproducibility in high resolution tends to become unstable. Accordingly, a dot-collection-type dithering is preferably used. Therefore, in such a case, as in the above-mentioned case of combination with the Bayer-type scheme, optimization is performed on the dithering applied gray scale range, and also on other ranges by the above-described scheme according to the first embodiment of the present invention independently, and, after that, for the ranges in-between, the interpolation processing is applied for determining dot patterns on the relevant gray scale levels.

Furthermore, this combining scheme also be applied to a combination between a plurality of FM masks of different types. For example, as the conventional sequential method may be superior than FM mask produced according to the first embodiment of the present invention in terms of gray scale continuity, FM mask produced according to the conventional sequential method may be combined with FM mask produced according to the first embodiment of the present invention in case gray scale continuity should be more positively secured. Thus, it is possible to produce an FM mask finally having desired characteristics.

Thus, any FM mask suitable to the gray scale and resolution characteristic of an image mode applied in the image outputting unit can be easily built by using the halftone conversion mask producing-method in the first embodiment of this invention. When combining with the conventional halftone processing method especially, a dot arrangement obtained through the conventional scheme can be used as a dot pattern on the pick-up gray scale level, i.e., the dividing-point gray scale level, as mentioned above. Furthermore, according to this scheme, shortening of processing time and reduction of the number of dot patterns for finally forming the FM mask are possible by applying such a conventional method for a specific gray scale range.

Moreover, FM mask produced according to the first embodiment of the present invention may be applied to an image outputting unit, such as an electro-photographic type, thermal transfer type, or ink-jet type, which provides half-tone-dot image. It is possible to store the data of the FM mask into a recording medium of exclusive use, such as a ROM/non-volatile RAM, and to install it in an image outputting unit concerned as a form of an image-processing module. Alternatively, data of the FM mask produced according to the first embodiment of the present invention may be stored into another type of recording medium, such as FD (floppy disk), CD (compact disc), DVD (digital video disk), and a memory card, as a program for printer control, and may then be installed in a computer. Further, it is also possible to down-loading data of the FM mask through a network such as Internet, from a server and install the data of the FM mask in a computer. In any method, a processing speed equivalent to a case of applying the conventional dithering, and also, a high-definition reproducibility in a level higher than-a case of applying error diffusion scheme are realizable with application of FM mask according to the first embodiment of the present invention.

Figure 13:
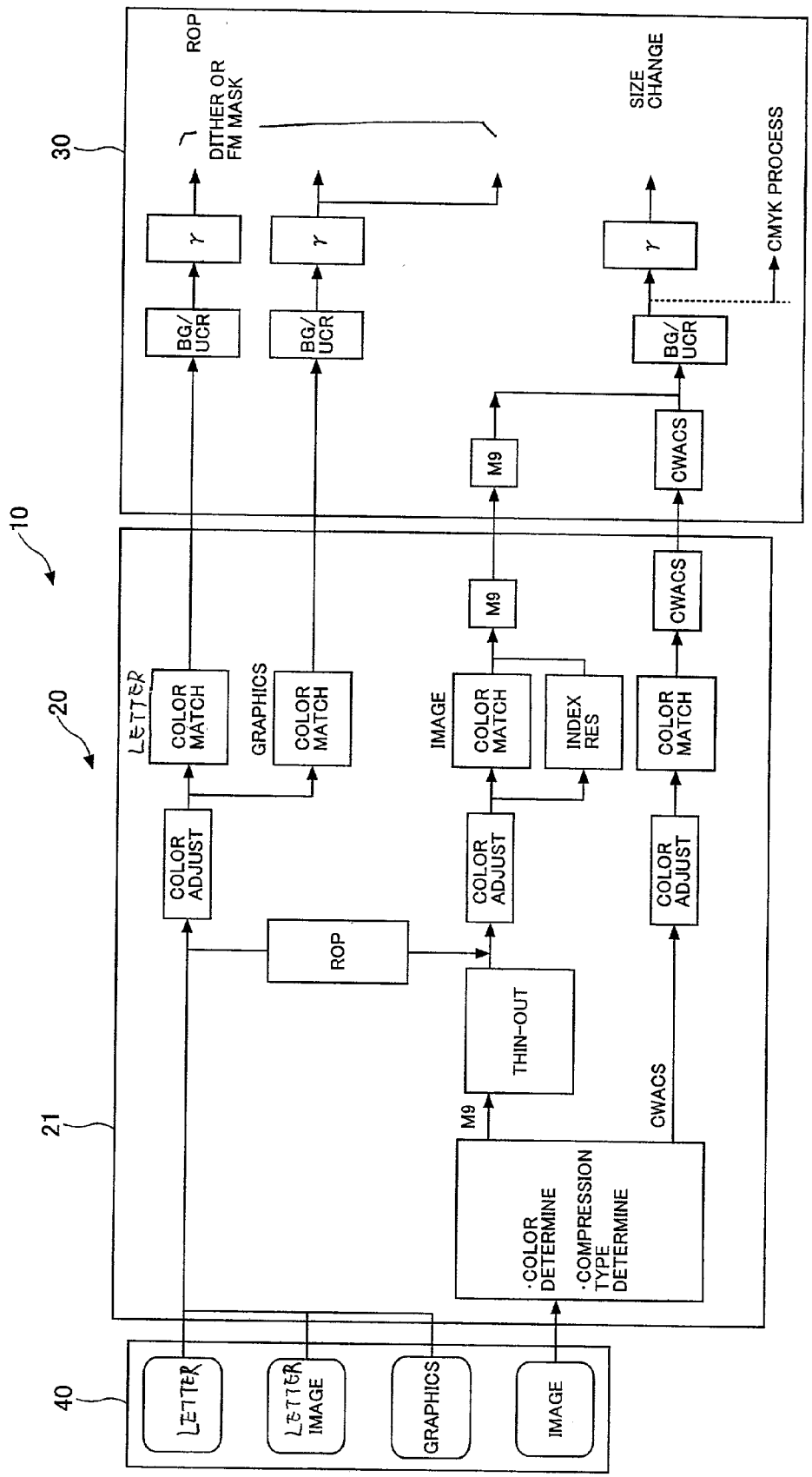
FIG. 13 shows an outline configuration of an image outputting unit using a halftone conversion mask produced by a halftone conversion mask producing method in the first embodiment of the present invention.

Moreover, as shown in FIG. 13, it is possible to apply the first embodiment of the present invention to a printer 30 connected to a computer 20 as an image outputting device 10. In this case, a printer driver (application software) 21 installed in the computer 20 performs processing of color matching of image processing to image data output from an intermediate module (GDI) 40 of image drawing processing on the OS (operating system) of a computer 20. Then, the remaining processing which includes the halftone processing according to the first embodiment of the present invention is performed by a processing module installed in the printer 30.

Although image processing is divided and is performed by the computer 20 and printer 30 separately in the case shown in FIG. 13, the computer 20 in recent years is developed greatly, and, thereby, in case processing can be achieved at high speed by utilizing software program completely including the necessary processing steps, all the image processing including processing according to the first embodiment of the present invention may be performed by the computer 20.

Since merely a small amount of operations are required for the optimization processing for producing FM mask, the above-mentioned void and cluster scheme is used in many cases. That is, according to the method which uses Fourier transform, since the frequency characteristic of a mask itself is finely adjusted, good FM mask in terms of graininess can be produced by considering human visuality characteristic, etc. However, a large amount of operation processing is needed, and unpractical operation time may be needed depending on a mask size in the Fourier transform scheme.

On the other hand, according to the void and cluster scheme, output image quality may be inferior to FM mask by the Fourier transform method in respect of the quality of the halftone conversion mask thus obtained, while merely small amount of operation processing is needed as mentioned above. However, in the void and cluster scheme, since optimization is performed by only dot exchange between void part and cluster part as mentioned above, a texture resulting from dot arrangement cannot be removed effectively. Consequently, the quality of FM mask finally formed is greatly influenced by the dot pattern at an initial state. Consequently, mask quality may be unable to be guaranteed completely there.

Generally, a white noise pattern is used as the initial dot pattern. When such an initial dot pattern is used, good FM mask is not necessarily produced by the above-mentioned void and the cluster scheme by the reason mentioned above. That is, when the quality of the white noise pattern is bad, then, before arriving at the optimum dot arrangement, a situation where only an inferior dot pattern in which merely a dot interval is uniform but texture remains may occur.

Moreover, a situation where only a dot pattern similar to mere "diffused dither pattern" which is hardly different from an initial state may occur as optimization processing has not been performed substantially since the uniform dot density is already established in the initial state in case a dot pattern which has a certain amount of uniformity like in the above-mentioned Bayer-type dither pattern is used as the initial pattern.

On the other hand, in above-mentioned Japanese laid-open patent application No. 8-80641, the method which uses a dot pattern by which error diffusion processing is carried out as an initial state is proposed. Since the pattern having undergone error diffusion processing has a random characteristic in dot interval along gray scale, an ideal FM mask may be obtained in some viewpoints. That is, a dot arrangement completed to some extent can be obtained at a beginning stage by using a dot pattern having undergone error diffusion processing. Consequently, FM mask finally obtained may also become good as compared with a case where the above-mentioned white noise pattern is used as the initial pattern.

However, as compared with FM mask obtained through the Fourier transform scheme, FM mask obtained by the method using the above-mentioned error diffusion processing pattern as the initial pattern may have a texture which is still conspicuous, and quality is low in many cases. It originates in that distortion must be circulated in the mask for several pixels according to a mask applying method such as that of the Fourier transform scheme, while, according to the error diffusion scheme, distortion is diffused outside, and adjustment is made for dot interval and dot arrangement with respect to an entire image.

In particular, as error diffusion should be performed on a mask size which is very small in comparison to the whole image to be processed to be used as the initial pattern, distortion which could not be diffused around appears in dot arrangement at an initial state, and affects the quality of FM mask finally obtained.

As distortions occurring during error diffusion processing, there are typically, "worm" and "swept-together". A problematic one here is a dot arrangement with uniform dot intervals occurring near an edge of the mask due to the above-mentioned "swept-together" effect. That is, in case on-dots are arranged in the mark edge part with somewhat uniform on-dot intervals, this regularity cannot be removed by the above-mentioned void and cluster scheme, and, finally, a texture which emphasizes mask edge may occur.

The present invention also takes into consideration on this point, and aims at improvement in FM mask quality while maintaining an effect of reduction in amount of operation processing on the void and cluster scheme in a second embodiment of the present invention which will now be described.

Specifically, when relative distance between respective on-dots are calculated according to the void and cluster scheme, a weight is applied to the evaluation with respect to arrangement of on-dots in a specific direction centering on vertical and horizontal directions, respectively, and processing should be made such that dot arrangement along these directions be better controlled. When arrangement of on-dots with uniform on-dot intervals along vertical or horizontal direction which is likely to be conspicuous to human visuality is thus better controlled, the situation in that mask edge is emphasized is prevented. Accordingly, even it is an FM mask produced according to the void and cluster scheme, it becomes possible to obtain quality FM mask according to the second embodiment of the present invention.

Figures 14A, 14B:
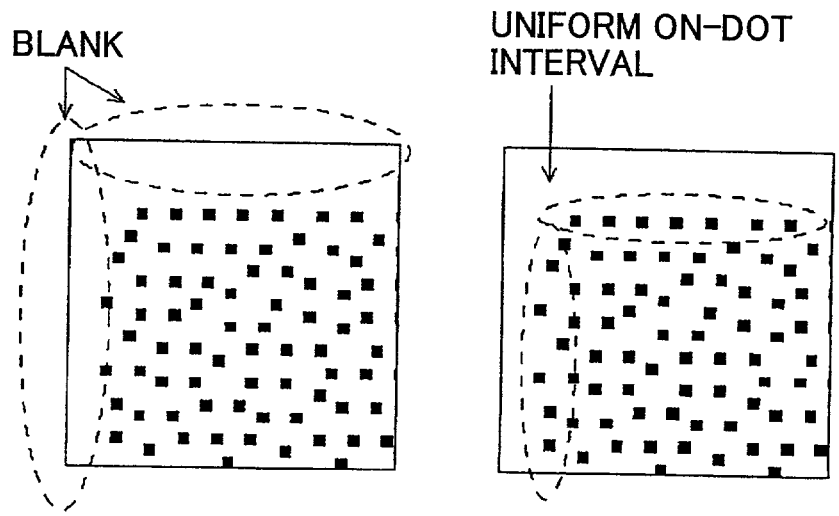
FIG. 14A illustrates a dot arrangement obtained by carrying out error diffusion processing on a uniform gray scale level image part with a blank occurring due to a swept-together effect.
FIG. 14B illustrates a state where on-dots are aligned with equal intervals at edges of such an error diffusion pattern shown in FIG. 14A.

FIG. 14A shows a halftone dot pattern obtained when error diffusion processing is performed on a gray-scale-fixed-area part at a certain gray scale level. In this case, the above-mentioned "swept-together" effect has occurred in which occurrence of on-dots is reduced until error is accumulated to some extent, as a problem inherent to the error diffusion scheme. Occurrence of such a blank part due to the "swept-together" effect may be a series problem in case of applying the error diffusion scheme.

According to the void and cluster scheme, on-dot density in an image space is made uniform during the optimization process. However, such a remarkable unevenness in on-dot density as that caused by the above-mentioned "swept-together" effect may not be effectively-eliminated even through the optimization process according to the void and cluster scheme is performed. This is because, according to the void and cluster scheme, almost no correction is made on an image part initially having some degree of uniformity in on-dot density.

Figure 15:
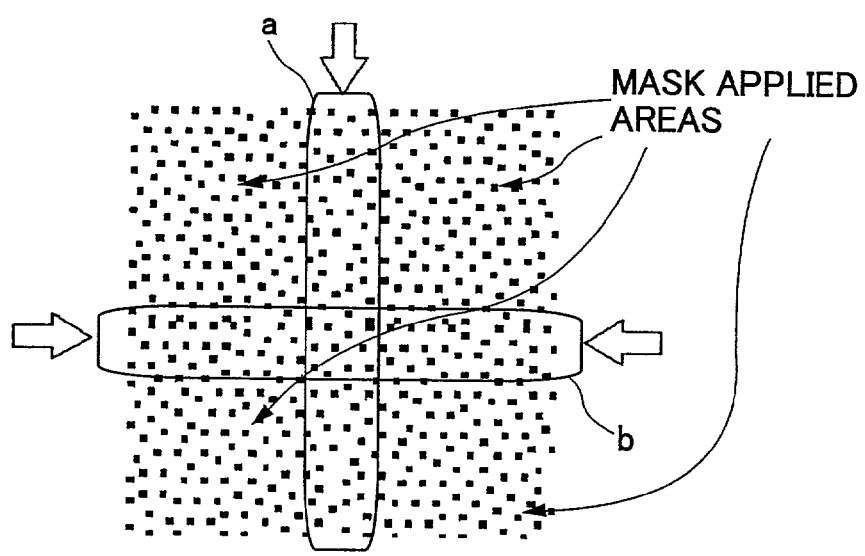
FIG. 15 illustrates a problematic situation in which a texture occurs to emphasize borders between mask applied areas in case the state shown in FIG. 14B is not corrected well.

That is, on the parts along the outer edges (top side and left side) of the mask enclosed by broken long circles shown in FIG. 14B where on-dot intervals are approximately uniform, an FM mask is produced while this regularity is maintained. As a result, as shown in FIG. 15, a final halftone dot image in a state where an on-dot coarse state part 'a' and an on-dot dense state part 'b' occur periodically so that each mask applied portion is emphasized is obtained. Such portions 'a' and 'b' are visually recognized as a remarkable texture resulting from repeated application of the mask.

According to the second embodiment of the present invention, an improvement is aimed at paying attention to this point. The following expression (formula (1)) is a formula equivalent to the formula used for evaluation of the relative distance between on-dots according to the void and cluster scheme:

Optimization Processing Function $$= \sum \exp\left[-\frac{(x^2 + y^2)}{2\sigma^2}\right] \quad (1)$$

where:

x, y denotes distance in x/y direction from a target dot; and $\sigma^2$ denotes a dispersion of on-dot intervals This formula is a formula for evaluating relative distance between on-dots in the periphery with respect to a target dot. By the evaluation value acquired by this formula, the dense state of on-dots in the periphery with respect to the target dot can be estimated. However, as shown in this formula, a vector of distance between on-dots is not reflected by the evaluation value. That is, since only the relative distance in scalar is evaluated there, any directional factor mentioned above on the dense state of on-dots is not considered.

In contrast thereto, according to the second embodiment of the present invention, the directional factor on the on-dots dense state, i.e., the vector of the relative distance between on-dots can be reflected by the evaluation value by providing a correction term $R(\theta)$ which varies according to the angle, as shown in the following formula (2):

Optimization Processing Function $$= \sum \exp\left[-\frac{(x^2 + y^2)}{2R(\theta) \cdot \sigma^2}\right] \quad (2)$$

where R (θ) :weight function, varying according to the angle θ.

Figure 16A:
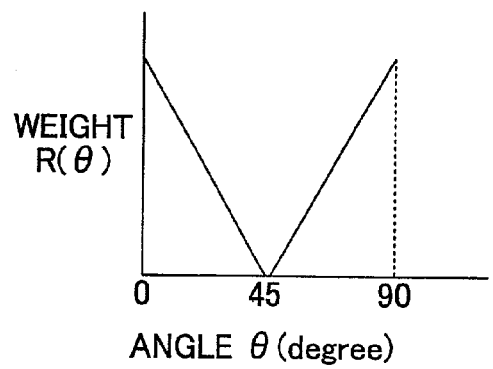
FIGS. 16A and 16B show examples of weighting function added to an evaluation formula used for an optimizing method in a second embodiment of the present invention.
Figure 16B:
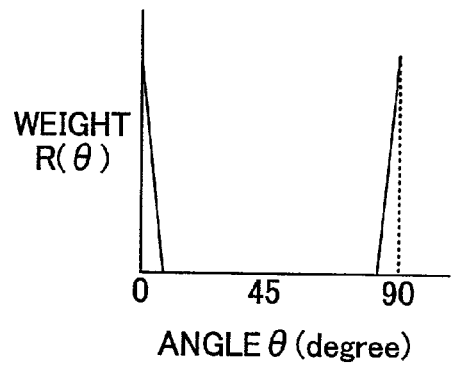

First, a case where this correction term R (θ) is made into a function in which a large angle range is covered toward 45° which is the middle from each of the angles 0° and 90°, and, through this range, the weight R(θ) changes gradually, as shown in FIG. 16A. In this case, as a result, on-dots are likely to be arranged with uniform intervals in a direction of 45°, and, thus, a random character is reduced there. In order to avoid such a situation, the correction term R(θ) is-set as a function in which the weight is applied and changes only for a narrow range around each of 0° and 90°, as shown in FIG. 16B. Further, for the ranges other than those, no correction is made by the correction term R(θ), and evaluation merely according to the relative distance is performed regardless of the directional factor there.

By providing this correction term R (θ), the influence on the evaluation value by the distance between the on-dots which exist near 0° or 90° with respect to the target dot becomes larger as compared with the influence by the distance between the on-dots which exist in other directions. Consequently, the distance of on-dots present around 0° or 90°, i.e., vertically or horizontally with respect to the target dot is recognized as being shorter than the actual value. According to the void and cluster scheme, since processing is made statistically such that on-dots which consequently maximize the distances between the on-dots may be set to be turned on, on-dots present vertically and horizontally are not likely to be turned on according to the scheme using the formula (2). Consequently, a possibility that on-dots are arranged with uniform intervals vertically or horizontally is effectively reduced.

Figure 17:
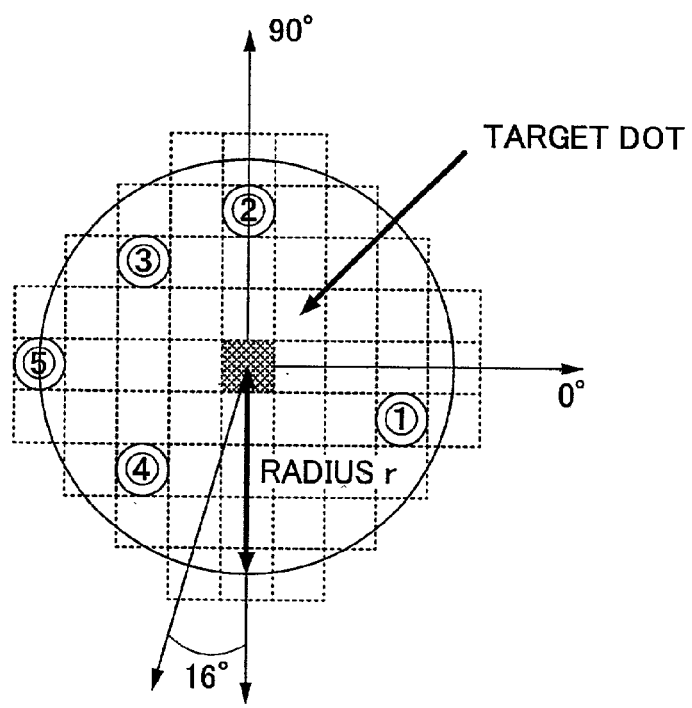
FIG. 17 illustrates the optimizing method in the second embodiment of the present invention.

With reference to FIG. 17, an example is given and thereby, optimization processing according to the second embodiment of the present invention will now be described. Assuming that an on-dot at a hatched square at the center shown in the figure is the target dot, the on-dots ①, ②, ③, ④ and ⑤ undergo the above-mentioned optimization processing function (evaluation). As will be described later in detail with reference to FIG. 18, the on-dots ③, ④ not present within the angle range of ±16° from each of the vertical and horizontal directions are removed from having the weight by the correction term R(θ) applied thereto, and, thus, have the above-mentioned formula (1) applied thereto. On the other hand, the on-dots ②, ⑤ present in the vertical/horizontal direction and the on-dot ① present within the above-mentioned angle range of ±16° from each of the vertical and horizontal directions have the weight by the correction term R(θ) applied thereto, and, thus, have the formula (2) applied thereto. In this case, according to FIG. 16B, the weight applied is heavy on the dot ② and ⑤ while it is light on the dot ①.

The reason for providing the above-mentioned margin ±16° from each of the vertical and horizontal directions will now be described. That is, human visuality recognizes as a texture a region extending along a direction as long as this region is conspicuous in on-dot dense state even when the direction is different slightly from 0° or 90°. On the other hand, the reason for defining the above-mentioned margin within the narrow range from each of 0° and 90° will now be described. As the sensitivity of human visuality becomes lower as the angle becomes far apart from 0° or 90°, when much weight is applied to a region wide from 0° or 90°, the irregularity/in-uniformity there is enhanced, and, thereby, regularity/uniformity on the other oblique regions are emphasized much.

In addition, although R (θ) has been described as a function varying linearly with reference to FIGS. 16A and 16B, this R(θ) may not be limited to a linear function, but may be an n-th function (n≧1). However, in a case of a function having a fixed value through a range near 0° or 90° were applied, an unnecessary blank zone may occur there. In order to prevent generation of such a situation, as shown in FIGS. 16A and 16B, it is necessary to set the weight as a function by which the weight positively decreases gradually from 0° or 90°.

Figure 18:
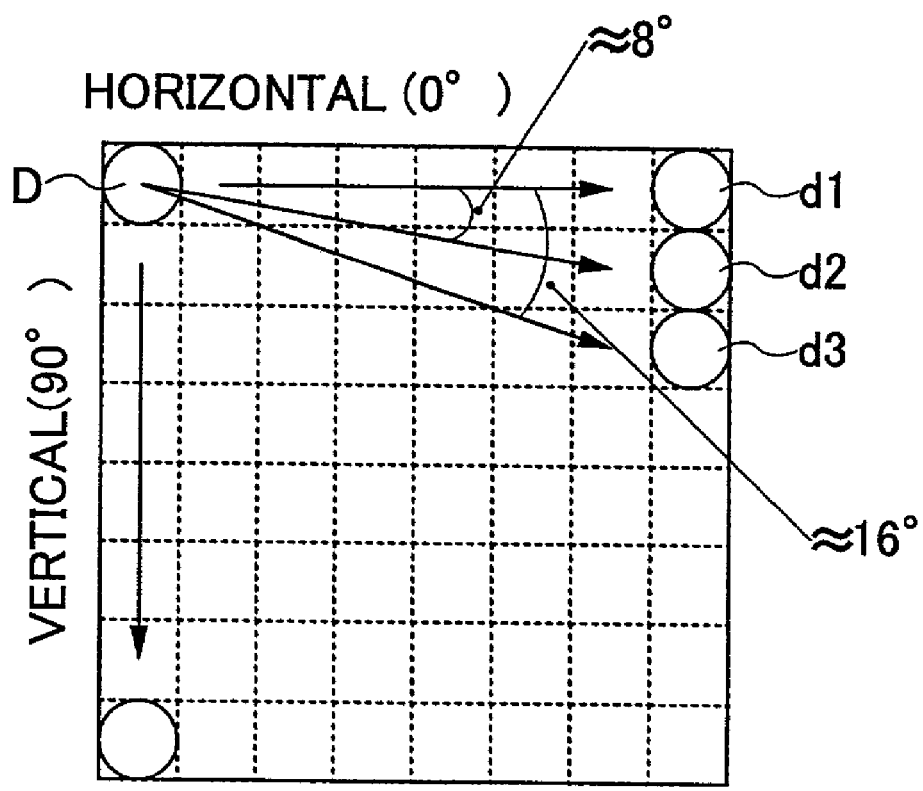
FIG. 18 illustrates a calculating method for upper/lower limits of an angle range of weighting shown in FIG. 16B.

Assuming a matrix of 8×8 dots as shown in FIG. 18, as the relevant mask, which area is necessary for providing a predetermined image quality as will be described later, an optimum margin of angle θ is determined as an angle range such as to cover a search range of two dots, as shown in the figure, i.e., ±8°. If the margin were determined less than this, it would not be possible to detect an alignment of on-dots around 0° or 90° in the 8×8 mask.

As to the upper limit of the margin, such a range as that an oblique direction less than ±45° should not be emphasized. Accordingly, assuming the same size of mask of 8×8, it is reasonable to set the upper limit as the search range for three dots d1 through d3 with respect to the target dot D, shown in FIG. 18, i.e., ±16°. In case of applying ±16° as the margin, the margin is total 32° which may not be regarded as vertical nor horizontal direction. However, in the 8×8 mask, and in case ±8° is set as the lower limit as mentioned above, it is reasonable to set ±16° as the upper limit obtained by adding ±1 dot to the lower limit in search range.

The reason why the 8×8 mask is assumed is that, as minimum 64 gray scale levels are needed for providing a predetermined image quality, and, in order to reproduce minimum 64 gray scale levels, the 8×8 mask size is needed.

Figure 19:
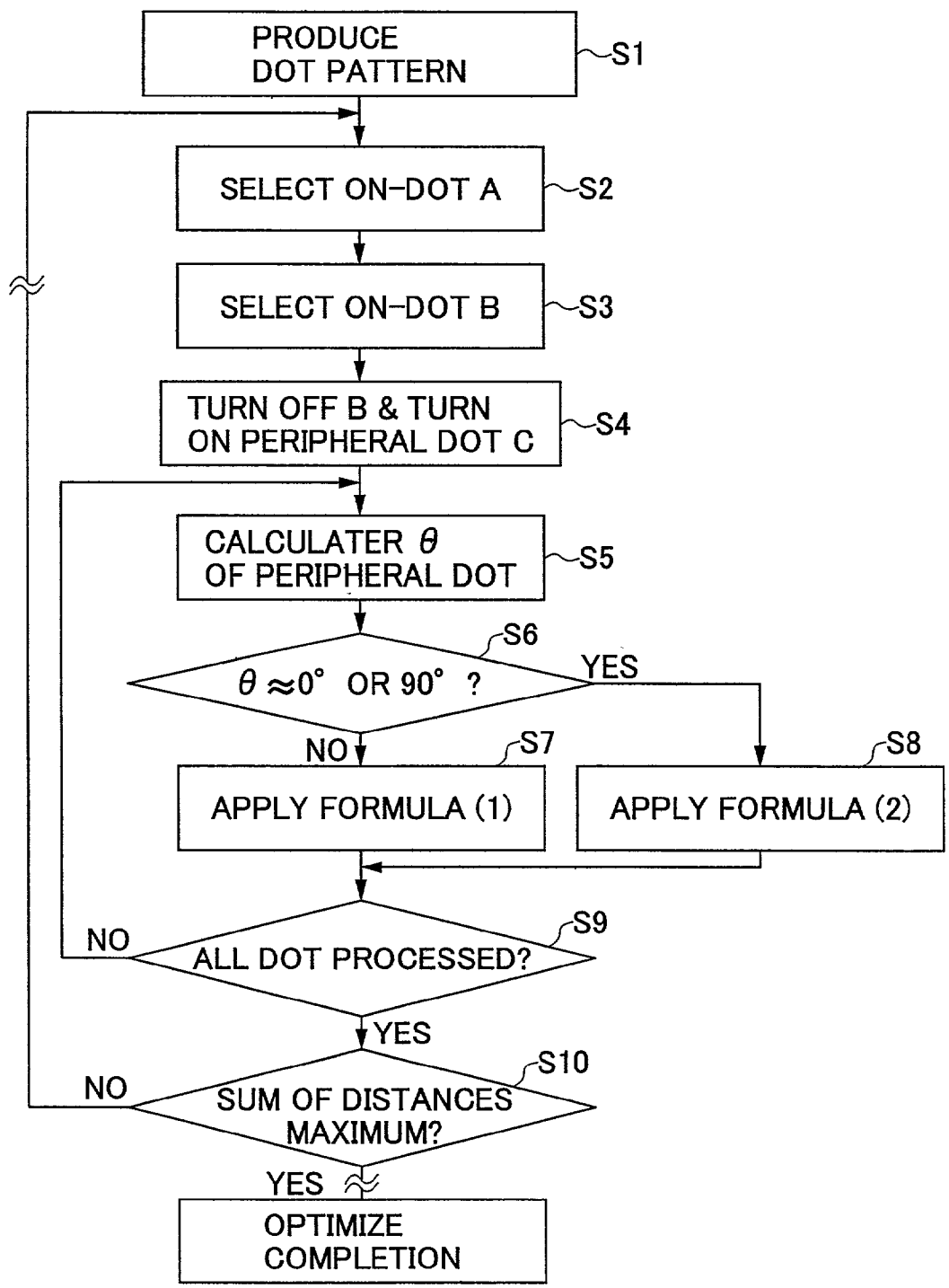
FIG. 19 shows an operation flow chart of the optimizing method in the-second embodiment of the present invention.

FIG. 19 shows an FM mask production flow according to the second embodiment of the present invention described above. This operation flow includes processing of determining as to whether all possible combinations of on-dots have been processed/tried, although not shown in the figure.

In FIG. 19, first, at Step S1, error diffusion processing is carried out for a predetermined gray scale level, and a dot pattern on the relevant gray scale level is produced. Subsequently, at Step S2, any on-dot A is chosen as a target dot.

Then, in Step S3, another on-dot B is also chosen. Next, in Step S4, the on-dot B is turned off, and any off-dot C is newly turned on.

Then, in Step S5, from the on-dot A, the angle θ to any other on-dot in the periphery is calculated, and it is determined whether this angle θ is within the range ±16° of 0° or 90° in Step S6. When the result of the determination is No, then, in Step S7, the relative distance between the on-dot A and the relevant periphery on-dot is calculated by the above-mentioned formula (1). When the determination result in Step S6 is Yes, the relative distance between the on-dot A and the relevant periphery on-dot is calculated by the above-mentioned formula (2) in Step S8.

In Step S9, it is determined whether the process in the Steps S5 through S7/S8 has finished for all the periphery on-dots after the operation of Steps S7 and S8. When the result of this determination is No, it returns to Step S5 and the same processing is performed on another periphery on-dot, and processing of Steps S6 and S7/S8 is repeated until the result of Step S9 becomes Yes.

When the determination result on Step S9 becomes Yes, subsequently the sum of the relative distances obtained at Steps S7/S8 are calculated in Step S10, and it is determined whether the value became the maximum. When the result of the determination is No, it returns to Step S2. When determination on Step S10 becomes Yes, the current processing is finished after predetermined processing, as determining that the optimization has been completed.

Various methods may be considered for the determination as to whether or not the sum of the relative distances is the maximum. For example, the processing of Steps S2 through S9 is repeated for all the combinations of the on-dot A and newly on-dot C, and, after that, a combination thereof such that the maximum result is obtained is selected as the optimized dot pattern.

Further, each of the above-mentioned formulas (1) and (2) has a smaller value as the relative distance becomes larger. Accordingly, if the calculation value obtained at Step S7/S8 is the calculation result of the formula itself, Step S10 determines whether or not the sum thereof is the minimum, and, when it is the minimum, the optimization is completed.

The optimum dot pattern on the predetermined gray scale level obtained by the optimization processing according to the second embodiment of the present invention corresponds to each dot pattern 1$a$, 1$b$, and 1$c$ shown in FIG. 4, or the dot pattern on the gray scale level m or n shown in FIG. 6, mentioned above in the description of the first embodiment of the present invention. Accordingly, the above-mentioned interpolation processing described with reference to FIGS. 7A through 11F is performed to produce dot patterns on the gray scale levels present between the gray scale levels at the pick-up dividing points based on the thus-obtained optimum dot patterns. As a result, the halftone conversion mask (FM mask) such as that shown in FIG. 5 can be derived.

Figure 20:
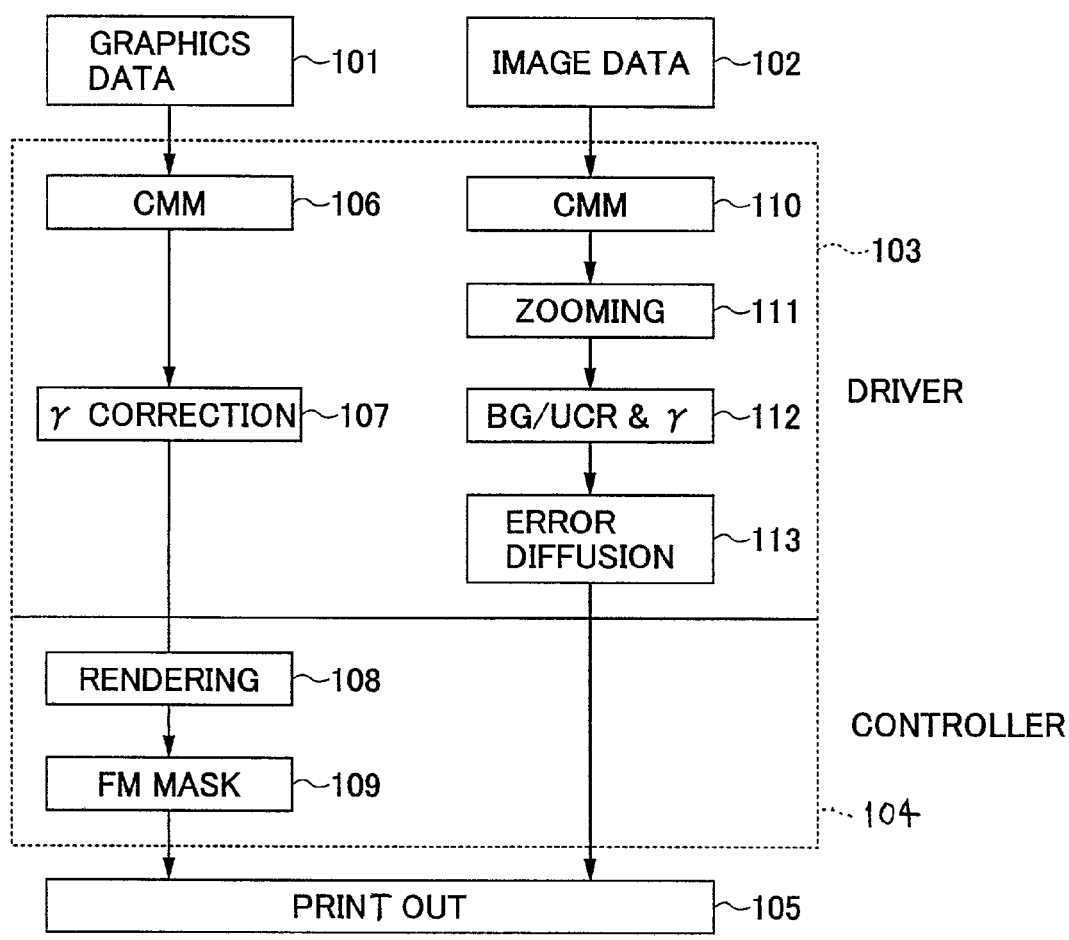
FIG. 20 shows an outline of a printer controller in which an FM mask produced using the optimizing method in the second embodiment of the present invention is applied.

FIG. 20 shows an example of a printer controller employing an FM mask obtained according to any of the above-mentioned first and second embodiments of the present invention. In FIG. 20, 101 denotes graphic data and 102 denotes image data. CMM processing 106 and 110 is performed on the graphic data 101 and the image data 102 by a driver (software) 103.

Subsequently, after gamma correction processing 107 is performed on the graphic data 101 and rendering processing 108 is performed by a controller 104, FM mask processing (halftone image generation processing) 109 according to the present invention is performed, and the thus-obtained halftone image is printed out by a printing device 105.

On the other hand, after the CMM processing 110 is performed, error diffusion processing 113 is performed and the image data 102 is printed out by the printing device 105 after zooming processing 111 is performed and BG/UCR and gamma correction processing 112 are performed.

Although the configuration which carries out the FM mask processing 109 by the controller of the printer is shown in FIG. 20, it is also possible that the same processing is performed by the driver software.

As for FM mask according to the present invention, it is possible to apply it to an outputting unit applied, such as an electro-photograph type, a thermal transfer type, or a ink-jet type which expresses a gray scale by halftone dots. It is also possible to store the mask data in ROM/non-volatile memory of exclusive use, and ASIC as a specific form, and to load the mask data in such an outputting unit as an image-processing module or to store the same in FD, CD, DVD, and memory card as a software program for printer control, or to down-load the same through a network etc., so as to install it in a computer. In any method, high-definition reproducibility as in the case of applying error dispersion method can be obtained.

Thus, according to the present invention, a method for effectively utilizing the respective advantages on various kinds of conventional FM mask generation schemes is provided, and, thus, an output of high halftone image can be provided with a reduced processing time.

Further, the present invention is not limited to the above-described embodiments, and variations and modifications may be made without departing from the scope of the present invention.

The present application is based on Japanese priority applications. Nos. 2001-75548 and 2001-155532, filed on Mar. 16, 2001 and May 24, 2001, respectively, the entire contents of which are hereby incorporated by reference.

The invention claimed is:

1. A method of producing a mask comprising threshold data for converting multi-level image data into a halftone image through comparison with a threshold for each pixel, comprising the steps of:
    a) determining a dot pattern on each of predetermined gray scale levels; and
    b) creating the mask by the dot patterns obtained at the step a),
    wherein said step a) determines the respective dot patterns independently for every gray scale level.

2. The method as claimed in claim 1, wherein:
    dot patterns on gray scale levels other than the predetermined gray scale levels are determined by interpolation processing based on the dot patterns on the predetermined gray scale levels.

3. The method as claimed in claim 2, wherein:
    the interpolation processing is such that difference between the dot patterns on the gray scale levels at both ends of the relevant interpolation section is cancelled in sequence.

4. The method as claimed in claim 3, wherein the interpolation processing such that difference between the dot patterns on the gray scale levels at both ends of the relevant interpolation section is cancelled in sequence is performed between neighboring dots according to a predetermined order 5. The method as claimed in claim 3, wherein the interpolation processing such that difference between the dot patterns on the gray scale levels at both ends of the relevant interpolation section is cancelled in sequence is performed in such an order that a dot arrangement having the best evaluation result be obtained after performing predetermined evaluation.

6. The method as claimed in claim 5, wherein the evaluation is of evaluating at least one of graininess and equal direction characteristic.

7. The method as claimed in claim 3, wherein the interpolation processing such that difference between the dot patterns on the gray scale levels at both ends of the relevant interpolation section is cancelled in sequence comprises the step of inserting a dot pattern comprising an on-dot which is not turned on in any of the dot patterns on the gray scale levels at both ends of the relevant interpolation section.

8. The method as claimed in claim 2, wherein the minimum interval between the predetermined gray scale levels is not less than $\frac{1}{32}$ of the total number of gray scale levels.

9. The method as claimed in claim 2, wherein the minimum interval between the predetermined gray scale levels is changed according to an image region of the image data to be processed.

10. The method as claimed in claim 1, comprising the step of sequentially determining dot patterns for each gray scale levels on the predetermined gray scale levels.

11. The method as claimed in claim 1, wherein said step a) comprises the step of determining dot patterns for the predetermined gray scale levels according to a Bayer-type dithering.

12. The method as claimed in claim 11, wherein the Bayer-type dithering is also applied for determining dot patterns on gray scale levels other than the predetermined gray scale levels on which the dot patterns are determined according to the Bayer-type dithering.

13. The method as claimed in claim 11, wherein dot patterns on gray scale levels other than the predetermined gray scale levels on which the dot patterns are determined according to the Bayer-type dithering are determined by halftone processing according to at least one of respective functions on a gray scale characteristic, a resolution and a pixel reproducibility of a device outputting the halftone image converted according to the method.

14. The method as claimed in claim 11, wherein dot patterns on gray scale levels other than the predetermined gray scale levels on which the dot patterns are determined according to the Bayer-type dithering are determined by halftone processing according to an image mode applied in a device outputting the halftone image converted according to the method.

15. A method of producing a mask comprising threshold data for converting multi-level image data into a halftone image through comparison with a threshold for each pixel, comprising the steps of:
   a) determining a dot pattern on each of predetermined gray scale levels; and
   b) creating the mask by the dot patterns obtained at the step a),
   wherein said step a) comprises the step a1) of evaluating a distance between on-dots in the dot pattern,
   wherein said step a1) performs the evaluation on a specific direction with a weight applied thereto.

16. The method as claimed in claim 15, wherein said step a) determines the respective dot patterns independently for every gray scale level.

17. The method as claimed in claim 15, wherein said specific direction comprises approximately vertical direction and approximately horizontal direction.

18. The method as claimed in claim 15, wherein said specific direction comprises a range of approximately 8° through 16° on each of both sides of a predetermined direction.

19. The method as claimed in claim 15, wherein said step a1) is performed in such a manner that the weight be reduced gradually from a predetermined direction toward both sides thereof within a predetermined range.

20. An image outputting device outputting a halftone image obtained from multi-level image data by using a mask produced according to claim 1, by one of an electrophotographic scheme, an ink-jet scheme and a thermal transfer scheme.

21. An image outputting device outputting a halftone image obtained from multi-level image data by using a mask produced according to claim 15, by one of an electrophotographic scheme, an ink-jet scheme and a thermal transfer scheme.

22. A computer readable recording medium storing therein a software program for causing a computer to perform the method claimed in claim 1, so as to produce a mask for converting multi-level image data into a halftone image.

23. A computer readable recording medium storing therein a software program for causing a computer to perform the method claimed in claim 15, so as to produce a mask for converting multi-level image data into a halftone image.

24. A computer readable recording medium storing therein a software program for causing a computer to use mask data for converting multi-level image data into a halftone image produced according to the method claimed in claim 1.

25. A computer readable recording medium storing therein a software program for causing a mask data for converting multi-level image data into a halftone image produced according to the method claimed in claim 15.

* * * * *